United States Patent
Goodwin, III

(10) Patent No.: US 7,347,372 B1
(45) Date of Patent: Mar. 25, 2008

(54) SYSTEM AND METHOD OF NOTIFYING AN OPERATOR OF A RESULT OF ATTEMPTING TO READ A PRODUCT LABEL

(75) Inventor: John C Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 93 days.

(21) Appl. No.: 10/656,783

(22) Filed: Sep. 5, 2003

(51) Int. Cl.
*G02B 26/10* (2006.01)
(52) U.S. Cl. .............................. 235/462.25; 235/462.14
(58) Field of Classification Search ........... 235/462.25, 235/462.14, 472.01, 472.02; 340/572.1, 340/3.6, 3.7, 815.45, 384.1
See application file for complete search history.

(56) References Cited

U.S. PATENT DOCUMENTS

| | | | |
|---|---|---|---|
| 4,816,824 A | 3/1989 | Katz et al. | 340/825.34 |
| 5,121,103 A * | 6/1992 | Minasy et al. | 340/551 |
| 5,151,684 A * | 9/1992 | Johnsen | 340/568.1 |
| 5,239,167 A | 8/1993 | Kipp | 235/383 |
| 5,640,002 A * | 6/1997 | Ruppert et al. | 235/462.46 |
| 6,019,394 A | 2/2000 | Chenoweth et al. | 283/81 |
| 6,119,941 A * | 9/2000 | Katsandres et al. | 235/472.01 |
| 6,286,762 B1 * | 9/2001 | Reynolds et al. | 235/472.01 |
| 6,719,202 B1 * | 4/2004 | Kawai et al. | 235/462.13 |
| 2001/0038037 A1 * | 11/2001 | Bridgelall et al. | 235/462.14 |

FOREIGN PATENT DOCUMENTS

JP 2001052105 A * 2/2001

* cited by examiner

*Primary Examiner*—Daniel StCyr
(74) *Attorney, Agent, or Firm*—Paul W. Martin; Harden E. Stevens, III

(57) ABSTRACT

A system for notifying an operator of a result of attempting to read a number of product labels on an item which produces only a single good read indication or bad read indication. The system includes a good read indicator, a bad read indicator, and control circuitry for notifying an operator of a result of attempting to read a number of product labels, including at least one of a barcode label and a radio frequency identification label on an item. The control circuitry activates a bad read indicator to indicate a single bad read indication if the control circuitry fails to receive item identification information from at least one of the barcode label and the radio frequency identification label, and activates a good read indicator to indicate a single good read indication if the control circuitry receives item identification information from at least one of the barcode label and the radio frequency identification label.

8 Claims, 3 Drawing Sheets

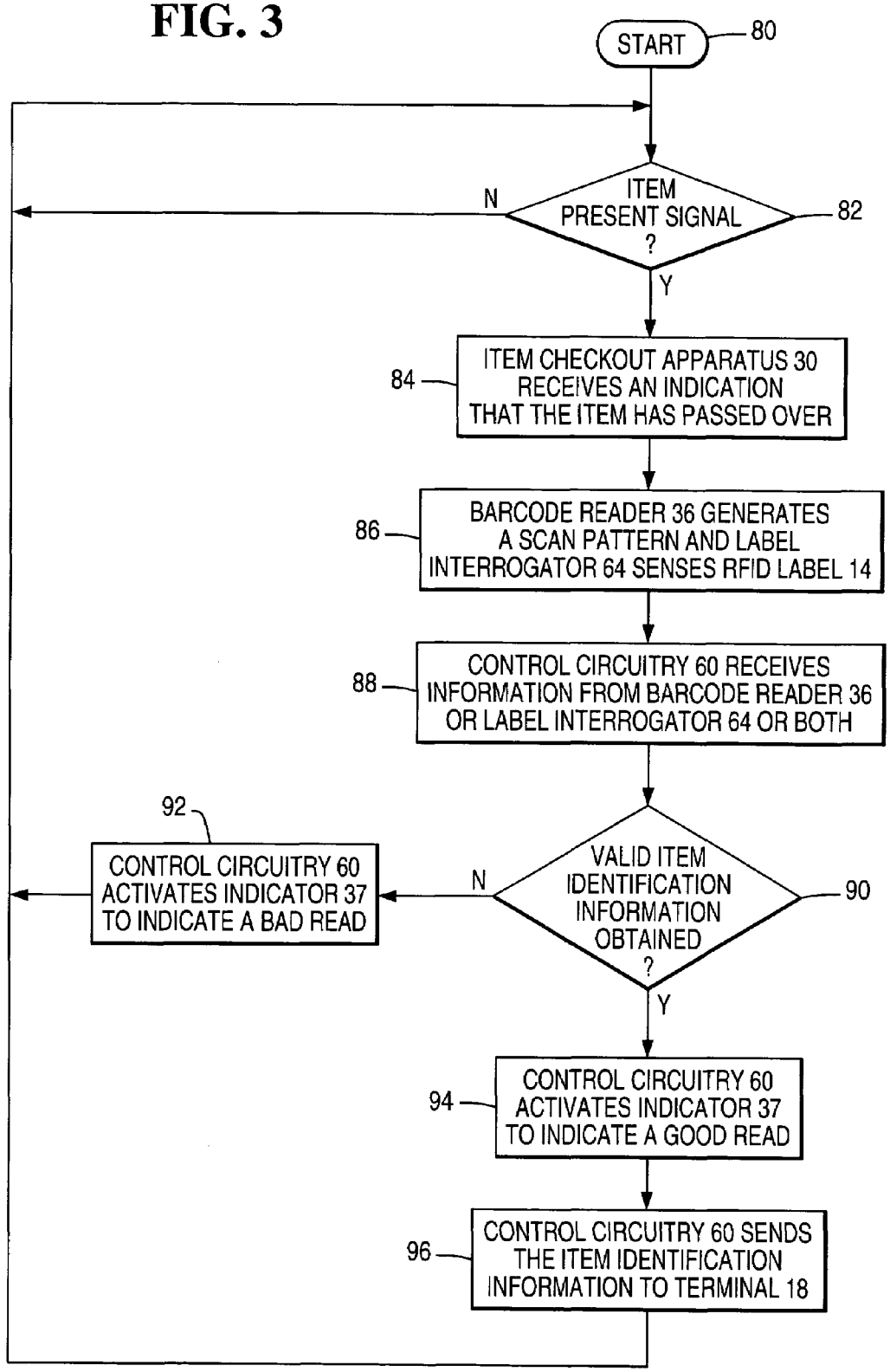

SYSTEM AND METHOD OF NOTIFYING AN OPERATOR OF A RESULT OF ATTEMPTING TO READ A PRODUCT LABEL

CROSS-REFERENCE TO RELATED APPLICATION

The present application is related to co-pending application Ser. No. 09/829,177, entitled "ITEM PROCESSING DEVICE WITH BARCODE READER AND INTEGRATED RFID INTERROGATOR", filed Apr. 9, 2001, and having as inventor, John Goodwin.

BACKGROUND OF THE INVENTION

The present invention relates to checkout systems in supermarkets and other retail establishments, and more specifically to a system and method of notifying an operator of a result of attempting to read a product label.

Checkout systems typically include barcode readers. Today, nearly all products are labelled with barcodes, either by the manufacturers or the retailers of such products.

Barcode readers come in various types for various purposes. The most common scanners are optical barcode readers which include lasers and mirrors for generating a scan pattern. Some are mounted in checkout counters, while others are portable and hand-held. Barcode readers typically provide an indication that a barcode has been successfully read, including sounding a tone and flashing a light. An example barcode reader is disclosed in U.S. Pat. No. 5,229,588 assigned to the assignee of the present invention. This patent is hereby incorporated by reference.

Some items may be labelled with both barcode labels and RFID labels. RFID technology may supplement or even replace bar code reader technology for distinguishing and recording items for purchase. Some of the uses of RFID technology are disclosed in U.S. Pat. No. 6,019,394 assigned to the assignee of the present invention. This patent is hereby incorporated by reference.

It would be desirable to provide a system and method of notifying an operator of a result of attempting to read a product label on products which are labelled with more than one type of label.

SUMMARY OF THE INVENTION

In accordance with the present invention, a system and method of notifying an operator of a result of attempting to read a product label is provided.

The system includes a good read indicator, a bad read indicator, and control circuitry for notifying an operator of a result of attempting to read a number of product labels, including at least one of a barcode label and a radio frequency identification label on an item. The control circuitry activates a bad read indicator to indicate a single bad read indication if the control circuitry fails to receive item identification information from at least one of the barcode label and the radio frequency identification label, and activates a good read indicator to indicate a single good read indication if the control circuitry receives item identification information from at least one of the barcode label and the radio frequency identification label.

It is accordingly an object of the present invention to provide a system and method of notifying an operator of a result of attempting to read a product label.

It is another object of the present invention to provide a system and method of notifying an operator of a result of attempting to read a product label on an item which may also have another type of label.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 3 is a flow diagram illustrating the operation of the checkout apparatus.

DETAILED DESCRIPTION

Figure 1:
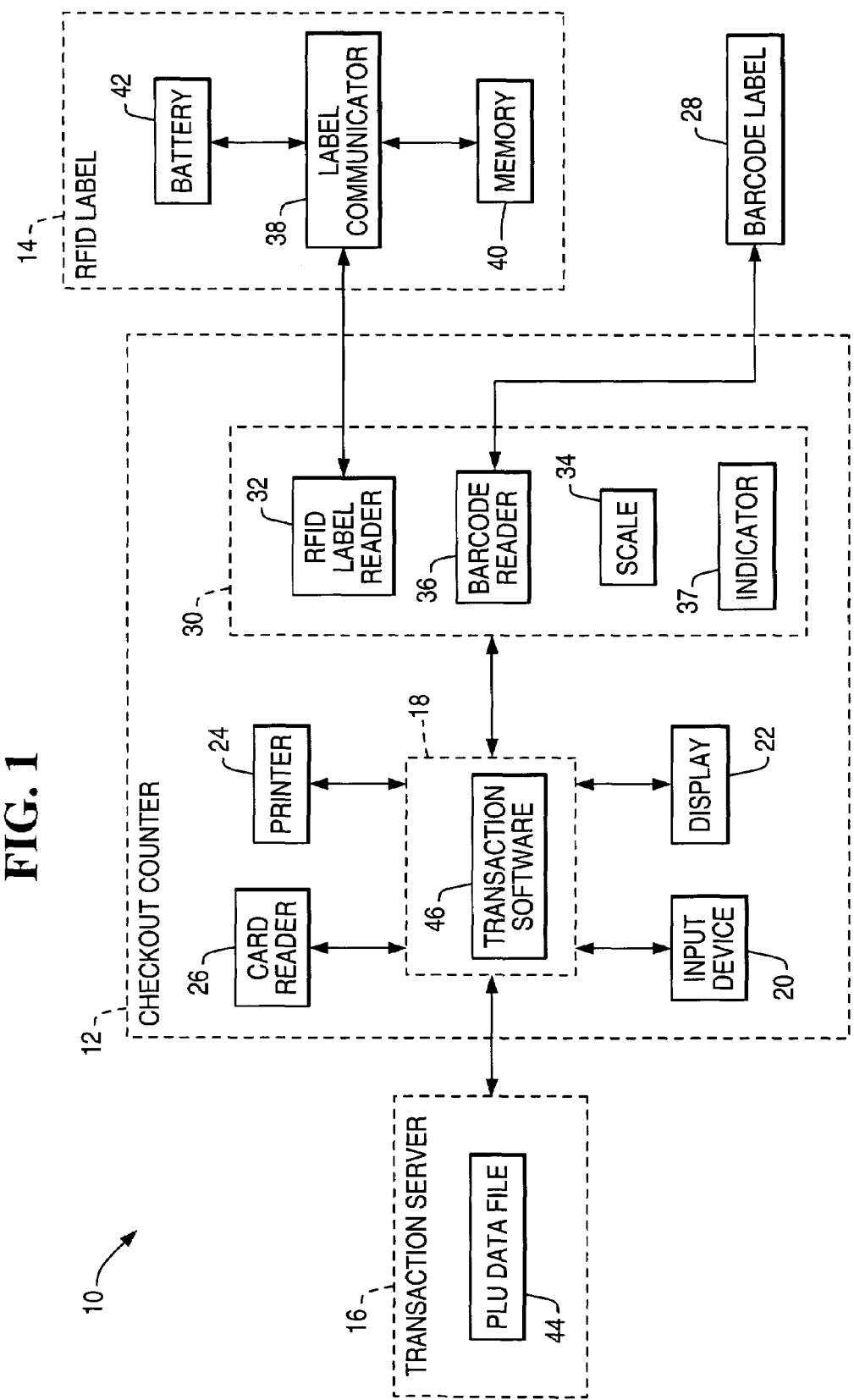
FIG. 1 is a block diagram of a transaction system with RFID capability.

Referring to FIG. 1, transaction system 10 primarily includes checkout counter 12 and transaction server 16.

Checkout counter 12 includes terminal 18, input device 20, display 22, printer 24, card reader 26, and checkout apparatus 30.

Terminal 18 controls operation of checkout counter 12 and executes transaction software 46.

Input device 20 records customer selections. Input device 20 may be a touch screen or keyboard.

Display 22 displays program instructions to assist the customer through a transaction. Display 22 may be a liquid crystal display and may be combined with input device 20 as a touch screen.

Printer 24 prints transaction information on receipt paper.

Card reader 26 reads information from customer payment and identification cards. Card reader 26 may include a magnetic stripe reader or smart card reader or combination of both.

Item checkout apparatus 30 reads RFID label 14 and barcode label 28. Item checkout apparatus 30 includes RFID label reader 32, scale 34, barcode reader 36, and indicator 37.

RFID label reader 32 reads identification information stored in RFID label 14.

Scale 34 provides weight information for produce items and other random weight or bulk items.

Barcode reader 36 reads barcode label 28.

Indicator 37 provides an indication that RFID label 14 or barcode label 28 has been successfully read, or that neither label has been read.

RFID label 14 is an identification label. RFID label 14 may vary in size, depending upon product size, and may be visible or hidden when attached to a product. RFID label 14 may be removably or permanently attached to the product.

In one embodiment, RFID label 14 includes label communicator 38, RFID memory, and battery 42.

Label communicator 38 sends item identification information stored in RFID memory 40 to label reader 32. Label communicator 38 may include an RF transceiver.

Memory 40 stores item identification information and may include a read-only memory (ROM) for one-time use, or a programmable ROM (EPROM) for repeated use.

Battery 42 provides power to label communicator 38.

In another embodiment, RFID label 14 may be a passive label. Passive RFID labels use very little energy and may only include label communicator 38. Power may be derived from radio waves.

Label communicator 38 may include a reflective antenna which has a frequency which is unique among RFID labels 14. Label communicator 38 communicates RFID label identification information which must be cross-referenced to obtain item identification information from a table. Label communicator 38 may include a number of antennas, such as conductive ink antennas.

Transaction server 16 receives item identification information from terminal 18 and returns price information from price look-up data file 44. Terminal 18 obtains item identification information from item checkout apparatus 30.

Figure 2:
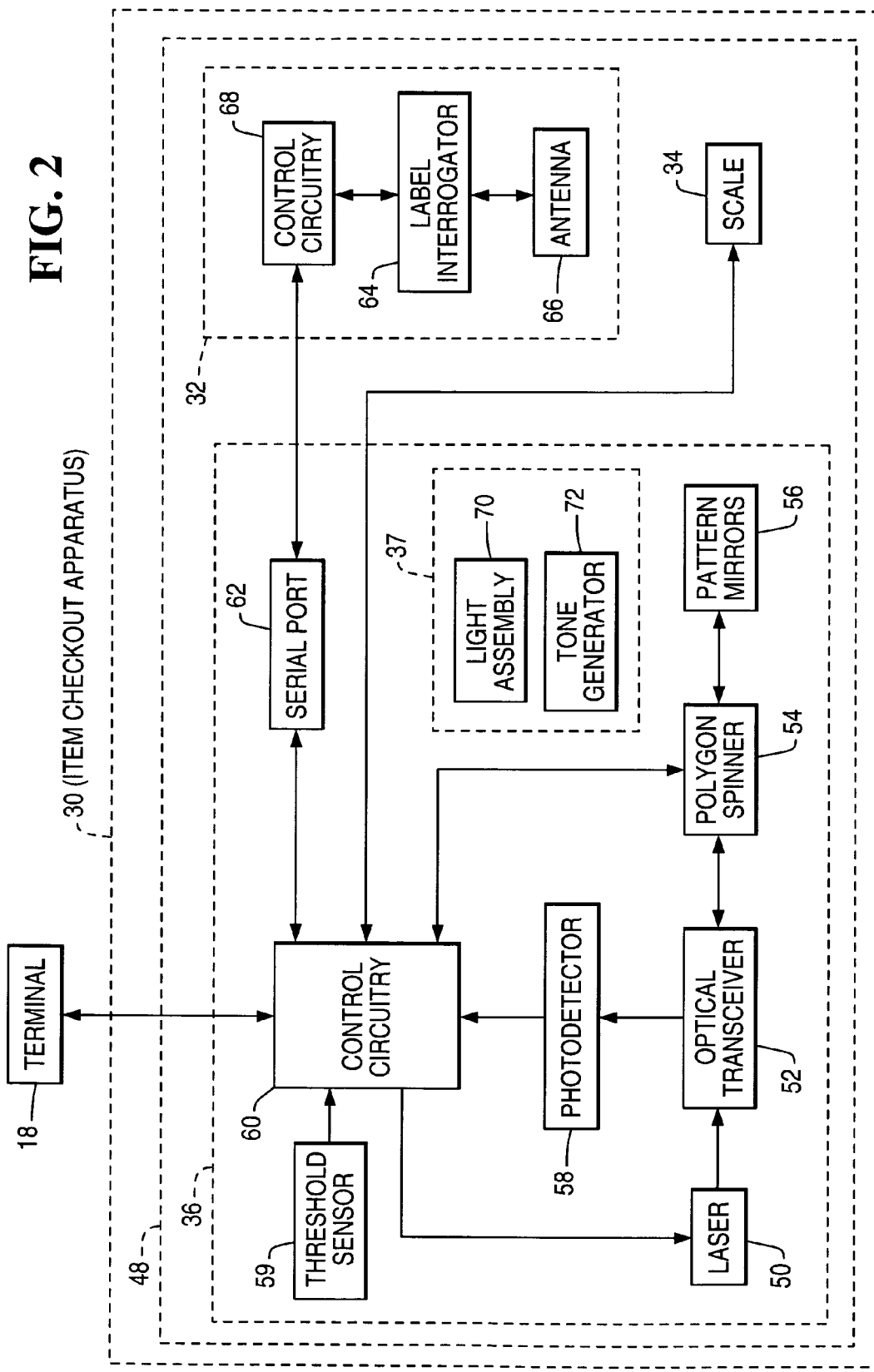
FIG. 2 is a block diagram of a checkout device of the present invention.

Turning now to FIG. 2, item checkout apparatus 30 is illustrated in detail.

RFID label reader 32 is preferably located inside housing 48 of barcode reader 36, but may also be affixed to the outside of the housing 48 as well. RFID label reader 32 includes label interrogator 64, antenna 66, and control circuitry 68.

Label interrogator 64 interrogates RFID label 14 to obtain identification information. Label interrogator 64 may include an RF transceiver. label interrogator 64 uses antenna 66.

Control circuitry 68 controls operation of RFID label reader 32 and provides identification information to terminal 18 through barcode reader 36. Control circuitry 68 may include commonly available circuitry for sensing the presence of an item. Control circuitry 60 may also wakeup certain components, such as laser 50, for operation.

Control circuitry 68 feeds identification information to control circuitry 60 through serial port 62, but may also feed identification information directly to terminal 18 without going through serial port 62 or control circuitry 60.

Control circuitry 60 activates indicator 37 upon successfully decoding barcode label 28 or upon receipt of item identification information from control circuitry 68. Control circuitry 60 activates light assembly 70 and/or tone generator 72 when a barcode label or RFID label have been read, but only once if both have been successfully read.

An example barcode reader 36 primarily includes laser 50, optical transceiver 52, polygon spinner 54, pattern mirrors 56, photodetector 58, and threshold sensor 59, and control circuitry 60. However, other types of barcode readers, including portable or hand-held barcode readers, are envisioned as well.

Laser 50 provides a laser beam. The laser beam passes through optical transceiver 52, which includes a mirrored collecting surface and an aperture for passing the laser beam.

Polygon spinner 54 includes mirrored facets which directing the laser beam at pattern mirrors 56. Pattern mirrors 56 direct the laser beam to produce a plurality of scan lines.

Light reflected from barcode label 28 is directed by pattern mirrors 56 to polygon spinner 54, which directs the light to optical transceiver 52. The collecting surface of optical transceiver 52 directs the light to photodetector 58, which generates electrical signals representing the intensity of the reflected light.

Threshold sensor 59 signals control circuitry 60 that an item is being moved across barcode reader 36. Threshold sensor 59 may include a motion or proximity sensor.

Control circuitry 60 interprets the electrical signals to determine item identification information.

Control circuitry 60 optionally obtains item identification information or RFID label identification information from RFID label reader 32 through serial port 62. If configured this way, control circuitry 60 passes identification information from both barcode label 28 and RFID label 14 to terminal 18.

Indicator 37 includes a light assembly 70 or tone generator 72, or combination of both. Light assembly 70 may include a green light indicating that RFID label 14 or barcode label 28 has been successfully read and a red light indicating a failure of any label to be read. Tone generator 72 may produce a first tone for a successful reading and a second tone for a failure to read any label.

Control circuitry 60 activates light assembly 70 and tone generator 72 when barcode label 28 or RFID label 14 have been read, but only one time if both have been read.

Referring now to FIG. 3, the operation of item checkout apparatus 30 is illustrated in detail beginning with START 80.

In step 82, item checkout apparatus 30 waits for an item.

In step 84, item checkout apparatus 30 receives an indication that the item has passed over. Barcode reader 36 receives a signal from threshold sensor 59. Label interrogator 64 establishes a sensing field.

In step 86, barcode reader 36 generates a scan pattern and label interrogator 64 senses RFID label 14.

In step 88, control circuitry 60 receives information from barcode reader 36 or label interrogator 64 or both.

In step 90, item checkout apparatus 30 determines whether the information contains valid item identification information. If so, operation proceeds to step 94. Otherwise, operation proceeds to step 92.

In step 92, control circuitry 60 activates indicator 37 to produce a single bad read indication. Control circuitry 60 may activate both light assembly 70 and tone generator 72.

In step 94, control circuitry 60 activates indicator 37 to produce a single good read indication. Control circuitry 60 may activate both light assembly 70 and tone generator 72.

In step 96, control circuitry 60 sends the item identification information to terminal 18. Terminal 18 obtains price information from PLU file 44 at transaction server 16.

Operation returns to step 82 to wait for another item.

Advantageously, item checkout device 30 produces only one good read indication if valid information is received from both barcode reader 36 and label interrogator 64. Also, item checkout device 30 produces only one bad read indication if valid information is not received from either barcode reader 36 or label interrogator 64.

Although the present invention has been described with particular reference to certain preferred embodiments thereof, variations and modifications of the present invention can be effected within the spirit and scope of the following claims.

What is claimed is:

1. A computer implemented method of notifying an operator of a result of attempting to read item identification information from a number of product labels on an item, the method comprising:

a) attempting to read the item identification information for the item from both a barcode label and a radio frequency identification label by a checkout device;

b) if the checkout device in the attempting step fails to read the item identification information from both the barcode label and the radio frequency identification label, activating a single bad read indicator to produce a single bad read indication indicating that the read of both labels by the checkout device has failed; and c) if the item identification information is read from at least one of the barcode label and the radio frequency identification label by the checkout device in response to the attempting step, activating a single good read indicator to produce a single good read indication where the single good read indication is used by the checkout device to indicate a good read from both labels.

2. The method of claim 1, wherein step b) further comprises:
   b-1) activating a bad read light indicator to produce a single bad read indication by the checkout device.

3. The method of claim 1, wherein step b) further comprises:
   b-1) activating a bad read tone indicator to produce a single bad read indication by the checkout device.

4. The method of claim 1, wherein step c) further comprises:
   c-1) activating a good read light indicator to produce a single good read indication by the checkout device.

5. The method of claim 1, wherein step c) further comprises:
   c-1) activating a good read tone indicator to produce a single good read indication by the checkout device.

6. A computer implemented method of notifying an operator of a result of attempting to read item identification information from a number of product labels on an item, the method comprising:
   a) receiving an indication that the item has passed over by a checkout device;
   b) attempting to read the item identification information for the item from both a barcode label and a radio frequency identification label by the checkout device;
   c) if the item identification information is not read by the checkout device in response to the attempting step, activating a single bad read indicator to produce a single bad read indication indicating that the read of both labels by the checkout device has failed; and
   d) if the item identification information is read from at least one of the barcode label and the radio frequency identification label by the checkout device in response to the attempting step, activating a single good read indicator to produce a single good read indication where the single good read indication is used by the checkout device to indicate a good read from both labels.

7. A system for notifying an operator of a result of attempting to read item identification information from a number of product labels on an item, the system comprising:
   a barcode reader;
   a radio frequency identification label reader;
   a good read indicator;
   a bad read indicator; and
   control circuitry for notifying an operator of a result of attempting to read the item identification information for the item from both a barcode label and a radio frequency identification label using the barcode reader and the radio frequency identification label reader,
   wherein the control circuitry activates the bad read indicator to produce a single bad read indication if the control circuitry fails to read the item identification information from both of the barcode label and the radio frequency identification label, and
   wherein the control circuitry activates the good read indicator to produce a single good read indication if the control circuitry receives the item identification information from at least one of the barcode label and the radio frequency identification label where the single good read indication is used to indicate a good read from both labels.

8. A checkout device comprising:
   a barcode reader;
   a radio frequency identification label reader;
   a good read indicator;
   a bad read indicator; and
   control circuitry for reading item identification information for an item by causing the barcode reader to generate a scan pattern for reading a barcode label and the radio frequency identification label reader to generate a sensing field for interrogating a radio frequency identification label, and for notifying an operator of a result of attempting to read the item identification information for an item from the barcode label and radio frequency identification label on the item,
   wherein the control circuitry activates the bad read indicator to produce a single bad read indication if the control circuitry fails to receive the item identification information from both of the scan pattern and the sensing field, and
   wherein the control circuitry activates the good read indicator to produce a single good read indication if the control circuitry receives the item identification information from at least one of the scan pattern and the sensing field where the single good read indication is used to indicate a good read from both the scan pattern and the sensing field.

* * * * *